(12) United States Patent
Kim et al.

(10) Patent No.: US 11,519,645 B2
(45) Date of Patent: Dec. 6, 2022

(54) AIR CONDITIONING APPARATUS

(71) Applicant: LG ELECTRONICS INC., Seoul (KR)

(72) Inventors: Kakjoong Kim, Seoul (KR); Chiwoo Song, Seoul (KR); Ilyoong Shin, Seoul (KR); Yongcheol Sa, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 17/134,747

(22) Filed: Dec. 28, 2020

(65) Prior Publication Data

US 2021/0231352 A1 Jul. 29, 2021

(30) Foreign Application Priority Data

Jan. 28, 2020 (KR) .................. 10-2020-0010086

(51) Int. Cl.
*F25B 1/00* (2006.01)
*F25B 39/02* (2006.01)
*F25B 13/00* (2006.01)

(52) U.S. Cl.
CPC .............. *F25B 39/02* (2013.01); *F25B 13/00* (2013.01)

(58) Field of Classification Search
CPC .......... F25B 39/02; F25B 13/00; F25B 41/24; F25B 41/40; F25B 41/42; F25B 47/02; F25B 47/022; F25B 2313/003; F25B 2313/007; F25B 2313/0231; F25B 2313/0233; F25B 2313/0253; F25B 2313/02732; F25B 2400/075; F25B 2400/24; F25B 2600/2516; F25B 25/005

USPC ......................................................... 62/498
See application file for complete search history.

(56) References Cited

U.S. PATENT DOCUMENTS

| | | |
|---|---|---|
| 2013/0305758 A1 | 11/2013 | Matsui |
| 2015/0040593 A1 | 2/2015 | Ariga |
| 2015/0316275 A1 | 11/2015 | Yamashita et al. |
| 2016/0245539 A1 | 8/2016 | Motomura et al. |
| 2016/0273816 A1 | 9/2016 | Horiuchi |
| 2018/0187936 A1 | 7/2018 | Najima |

(Continued)

FOREIGN PATENT DOCUMENTS

| | | |
|---|---|---|
| CN | 102434914 | 5/2012 |
| CN | 104903656 | 9/2015 |
| CN | 105579791 | 5/2016 |

(Continued)

OTHER PUBLICATIONS

Chinese Office Action dated Apr. 27, 2022 issued in Application No. 202110047096.7.

(Continued)

*Primary Examiner* — Henry T Crenshaw
*Assistant Examiner* — Kamran Tavakoldavani
(74) *Attorney, Agent, or Firm* — Ked & Associates (57) ABSTRACT

An air conditioning apparatus may include an outdoor unit through which a first fluid, such as refrigerant circulates, an indoor unit through which a second fluid, such as water circulates, a heat exchange device which is configured to connect the outdoor unit to the indoor unit and in which the first fluid and the second fluid are heat-exchanged with each other, first to third inner tubes configured to connect the outdoor unit to the heat exchange device, and a heat storage unit connected to the first to third inner tubes.

20 Claims, 8 Drawing Sheets

(56) References Cited

U.S. PATENT DOCUMENTS

2021/0095905 A1  4/2021  Tashiro et al.

FOREIGN PATENT DOCUMENTS

| | | |
|---|---|---|
| CN | 110050162 | 7/2019 |
| EP | 1533154 | 5/2005 |
| EP | 2390588 | 11/2011 |
| EP | 2508819 | 10/2012 |
| EP | 3859237 | 8/2021 |
| JP | 2003-302131 | 10/2003 |
| JP | 5279919 | 9/2013 |
| KR | 10-2016-0091298 | 8/2016 |
| KR | 10-2021-0100337 | 8/2021 |
| KR | KR 10-2021-0096521 | 8/2021 |
| WO | WO 2014/141381 | 9/2014 |
| WO | WO-2018198220 A1 * | 11/2018 .............. F25B 47/02 |

OTHER PUBLICATIONS

Chinese Office Action issued in Application No. 202110047096.7 dated Aug. 2, 2022.

\* cited by examiner

AIR CONDITIONING APPARATUS

CROSS-REFERENCE TO RELATED APPLICATION(S)

This application is based on and claims the benefit of priority to Korean Patent Application No. 10-2020-0010086, filed in Korea on Jan. 28, 2020, in the Korean Intellectual Property Office, the disclosure of which is incorporated herein in its entirety by reference.

BACKGROUND

1. Field

An air conditioning apparatus is disclosed herein.

2. Background

Air conditioning apparatuses are apparatuses that maintain air within a predetermined space in a most proper state according to a use and purpose thereof. In general, such an air conditioning apparatus includes a compressor, a condenser, an expansion device, and evaporator. Thus, the air conditioning apparatus has a refrigerant cycle in which compression, condensation, expansion, and evaporation processes of a refrigerant are performed to cool or heat a predetermined space.

The predetermined space may be variously provided according to a place in which the air conditioning apparatus is used. For example, the air conditioning apparatus may be used in a home or an office.

When the air conditioning apparatus performs a cooling operation, an outdoor heat exchanger provided in an outdoor unit may serve as a condenser, and an indoor heat exchanger provided in an indoor unit may serve as an evaporator. On the other hand, when the air conditioning apparatus performs a heating operation, the indoor heat exchanger may serve as the condenser, and the outdoor heat exchanger may serve as the evaporator.

In recent years, according to environmental regulations, there is a tendency to limit a type of refrigerant used in an air conditioning apparatus and to reduce an amount of used refrigerant. To reduce an amount of refrigerant to be used, a technique for performing cooling or heating by performing heat-exchange between a refrigerant and a predetermined fluid has been proposed. For example, the predetermined fluid may include water.

Japanese Patent Registration No. 5279919 (hereinafter "related art document"), which is entitled "Air Conditioning Apparatus", and which is hereby incorporated by reference, discloses a system for performing cooling or heating through heat exchanger between a refrigerant and water. According to the related art document, the air conditioning apparatus includes an outdoor unit, a heat medium converter, and an indoor unit. The heat medium converter includes a heat exchanger, a fastening device disposed at an upstream side of the heat exchanger, and a refrigerant passage changing device disposed at a downstream side of the heat exchanger. The refrigerant passage changing device is connected to a refrigerant tube through which a refrigerant in a low-temperature state flows during a cooling operation.

However, according to such related art document, there is a limitation in that the heat exchanger is damaged when water is frozen as the fluid contains water. In this case, the water is permeated into a refrigerant-side tube causing enormous damage, and thus, the entire system has to be replaced. Also, there is a limitation in that there is a risk of freezing and breaking because heat required for defrosting is transmitted from the water that does not obtain heat from air during an oil collection/defrosting operation.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the accompanying drawings. Exemplary embodiments will be described below with reference to the accompanying drawings. It is noted that the same or similar components in the drawings are designated by the same reference numerals as far as possible even if they are shown in different drawings. Further, in description of embodiments, when it is determined that detailed descriptions of well-known configurations or functions disturb understanding of the embodiments, the detailed descriptions will be omitted.

Also, in the description of the embodiments, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 1:
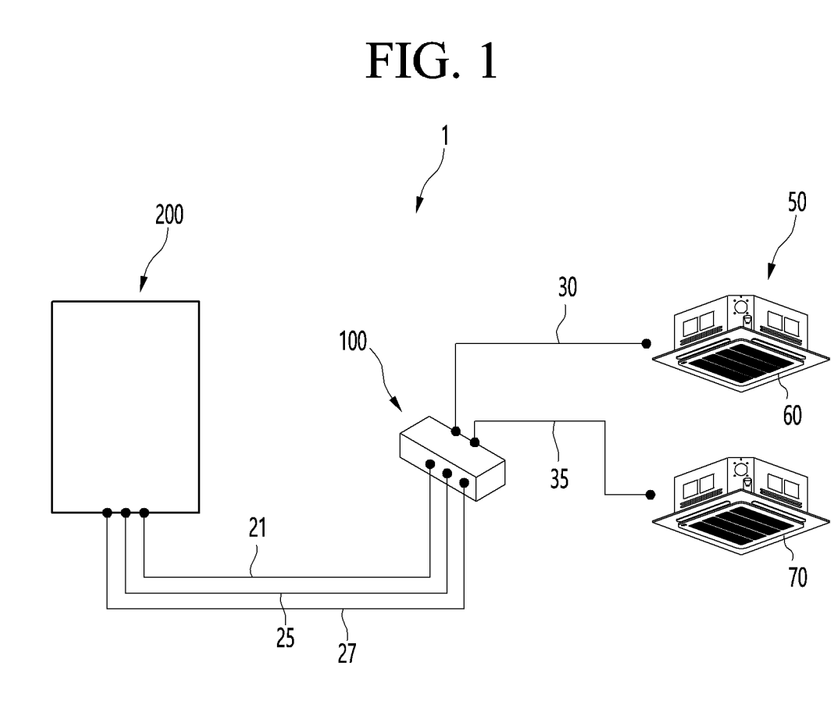
FIG. 1 is a schematic view of an air conditioning apparatus according to an embodiment.
Figure 2:
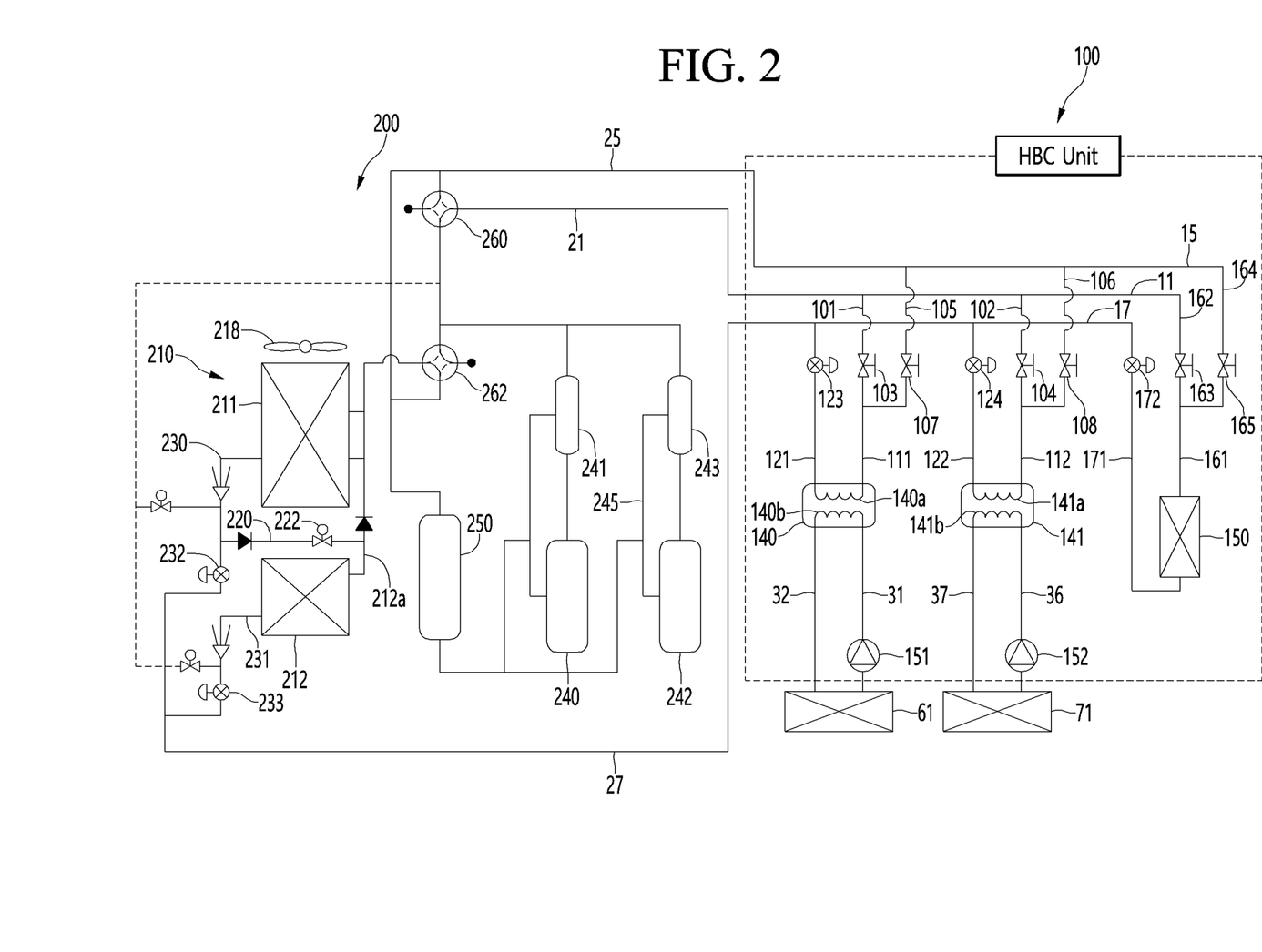
FIG. 2 is a cycle diagram of the air conditioning apparatus according to an embodiment.

FIG. 1 is a schematic view of an air conditioning apparatus according to an embodiment. FIG. 2 is a cycle diagram illustrating the air conditioning apparatus according to an embodiment.

Referring to FIGS. 1 and 2, an air conditioning apparatus 1 according to an embodiment may be connected to an outdoor unit 200, an indoor unit 50, and a heat exchange device 100 connected to the outdoor unit 200 and the indoor unit 50. The outdoor unit 200 and the heat exchange device 100 may be fluidly connected by a first fluid. For example, the first fluid may include a refrigerant. The refrigerant may flow through a refrigerant-side passage of a heat exchanger, which is provided in the heat exchange device 100, and the outdoor unit 200.

The outdoor unit 200 may include a plurality of compressors 240 and 242 and oil separators 241 and 243, which may be disposed at outlet-sides of the plurality of compressors 240 and 242 to separate oil from the refrigerant discharged from the plurality of compressors 240 and 242.

The plurality of compressors 240 and 242 may include first compressor 240 and second compressor 242, which may be connected in parallel to each other. Also, the oil separators 241 and 243 may include first oil separator 241 disposed at an outlet-side of the first compressor 240 and second oil separator 243 disposed at an outlet-side of the second compressor 242.

The outdoor unit 200 may include a collection passage 245 that collects the oil from the oil separators 241 and 243 into the compressors 240 and 242. That is, the oil collection passage 245 may extend from the first oil separator 241 to the first compressor 240 and from the second oil separator 243 to the second compressor 242.

Flow switching portions 260 and 262 that guide the refrigerant discharged from the compressors 240 and 242 to the outdoor heat exchange device 200 or the indoor unit may be provided at outlet-sides of the oil separators 241 and 243. For example, the flow switching portions 260 and 262 may include first flow switching portion 260 and second flow switching portion 262. The flow switching portions 260 and 262 may be, for example, three-way valves.

When the air conditioning apparatus operates in a cooling mode, the refrigerant may be introduced from the flow switching portion 262 into the outdoor heat exchanger 210. On the other hand, when the air conditioning apparatus performs a heating operation, the refrigerant may be introduced from the flow switching portion 262 toward the indoor heat exchanger 300 of the indoor unit.

Also, the outdoor unit 200 may be provided with a gas-liquid separator 250 connected to inlet-sides of the plurality of compressors 240 and 242. The gas/liquid separator 250 may be configured to separate gaseous refrigerant from the refrigerant before the refrigerant is introduced into the compressors 240 and 242. The separated gaseous refrigerant may be introduced into the compressors 240 and 242.

When the air conditioning apparatus performs the cooling operation, the refrigerant passing through an outdoor heat exchange device 210 may be introduced into a third outdoor unit connection tube 27. The outdoor heat exchange device 210 may include a plurality of heat exchange portions (heat exchangers) 211 and 212 and an outdoor fan 218. The plurality of heat exchange portions (heat exchangers) 211 and 212 may include first heat exchange portion (heat exchanger) 211 and second heat exchange portion (heat exchanger) 212 which may be connected in parallel to each other.

Also, the outdoor heat exchange device 210 may include a variable passage 220 that guides a flow of the refrigerant from an outlet-side of the first heat exchange portion 212 to an inlet-side of the second heat exchange portion 212. The variable passage 220 may extend from a first outlet tube 230 which is an outlet-side tube of the first heat exchange portion 212 to an inlet tube 212a which is an inlet-side tube of the second heat exchange portion 212.

A first valve 222 that selectively blocks a flow of the refrigerant flowing toward the variable passage 220 may be provided in the outdoor heat exchange device 210. The refrigerant passing through the first heat exchange portion 211 may be selectively introduced into the second heat exchange portion 212 according to whether the first valve 222 is turned on or off.

When the first valve 222 is turned on or opened, the refrigerant passing through the first heat exchange portion 211 flows into the inlet tube 212a via the variable passage 220 and then is heat-exchanged in the second heat exchange portion 212. Also, the refrigerant passing through the second heat exchange portion 212 may be introduced into the third outdoor unit connection tube 27 through a second outlet tube 231. On the other hand, when the first valve 222 is turned off or closed, the refrigerant passing through the first heat exchange portion 211 may be introduced into the third outdoor unit connection tube 27 through the first outlet tube 230.

A second valve 232 that adjusts a flow of the refrigerant may be disposed in the first outlet tube 230, and a third valve 233 that adjusts a flow of the refrigerant may be disposed in the second outlet tube 231. The second valve 232 and the third valve 233 may be connected to each other in parallel.

When the second valve 232 is opened or increases in opening degree, an amount of refrigerant flowing through the first outlet tube 230 may increase. Also, when the third valve 233 is opened or increases in opening degree, an amount of refrigerant flowing through the second outlet tube 231 may increase.

Each of the second valve 232 and the third valve 233 may include an electronic expansion valve (EEV). The EEV may adjust a degree of opening thereof to allow a pressure of the refrigerant passing through the expansion valve to decrease. For example, when the expansion valve is fully opened, the refrigerant may pass through the expansion valve without decreasing, and when the degree of opening of the expansion valve decreases, the refrigerant may be decompressed. A degree of decompression of the refrigerant may increase as the degree of opening decreases.

The first outlet tube 230 and the second outlet tube 231 may be combined with each other and connected to the third outdoor unit connection tube 27.

The air conditioning apparatus 1 may further include outdoor unit connection tubes 21, 25, and 27 that connect the outdoor unit 200 to the heat exchange device 100. The outdoor unit connection tubes 21, 25, and 27 may include first outdoor unit connection tube 21 as a gas tube (a high-pressure gas tube) through which a high-pressure gas refrigerant may flow, second outdoor unit connection tube 25 as a gas tube (a low-pressure gas tube) through which a low-pressure gas refrigerant may flow, and third outdoor unit connection tube 27 as a liquid tube through which a liquid refrigerant may flow. That is, the outdoor unit 200 and the heat exchange device 100 may have a "three tube connection structure", and the refrigerant may circulate through the outdoor unit 200 and the heat exchange device 100 by the three connection tubes 21, 25, and 27.

Also, the heat exchange device 100 may be provided with three inner tubes 11, 15, and 17 and be connected to the three outdoor unit connection tubes 21, 25, and 27, and the three inner tubes 11, 15, and 17 may be connected to the heat exchange device 100.

The heat exchange device 100 and the indoor unit 50 may be fluidly connected by a second fluid. For example, the second fluid may include water. The water may flow through a fluid passage of a heat exchanger, which is provided in the heat exchange device 100, and the outdoor unit 200.

The heat exchange device 100 may include a plurality of heat exchangers 140 and 141. Each of the heat exchangers 140 and 141 may include, for example, a plate heat exchanger.

The indoor unit 50 may include a plurality of indoor units 60 and 70. In this embodiment, the number of plurality of indoor units 60 and 70 is not limited. In FIG. 1, for example, two indoor units 60 and 70 are connected to the heat exchange device 100. The plurality of indoor units 60 and 70 may include first indoor unit 60 and second indoor unit 70.

The air conditioning apparatus 1 may further include tubes 30 and 35 that connect the heat exchange device 100 to the indoor unit 50. The tubes 30 and 35 may include first indoor unit connection tube 30 and second indoor unit connection tube 35, which connect the heat exchange device 100 to each of indoor units 60 and 70.

The water may circulate through the heat exchange device 100 and the indoor unit 50 via the indoor unit connection tubes 30 and 50. As the number of indoor units increases, the number of tubes connecting the heat exchange device 100a to the indoor units may also increase.

According to the above-described configuration, the refrigerant circulating through the outdoor unit 200 and the heat exchange device 100 and the water circulating through the heat exchange device 100 and the indoor unit 50 are heat-exchanged with each other through the heat exchangers 140 and 141 provided in the heat exchange device 100. The water cooled or heated through heat exchange may be heat-exchanged with the indoor heat exchangers 61 and 71 to perform cooling or heating in the indoor space.

The plurality of heat exchangers 140 and 141 may be provided in the same number as the number of plurality of indoor units 60 and 70. Alternatively, two or more indoor units may be connected to one heat exchanger.

Hereinafter, the heat exchange device 100 will be described.

The heat exchange device 100 may include first heat exchanger 140 and second heat exchanger 141, which may be fluidly connected to indoor units 60 and 70, respectively. The first heat exchanger 140 and the second heat exchanger 141 may have a same structure.

Each of the heat exchangers 140 and 141 may include a plate heat exchanger, for example, and a first fluid passage and a second fluid passage may be alternately stacked. That is, the heat exchangers 140 and 141 may include first fluid passages 140a and 141a and second fluid passages 140b and 141b, respectively.

The first fluid passages 140a and 141a may be fluidly connected to the outdoor unit 200, and the refrigerant discharged from the outdoor unit 200 may be introduced into the first fluid passages 140a and 141a, and then the refrigerant passing through the first fluid passages 140a and 141a may be introduced into the outdoor unit 200. The second fluid passages 140b and 141b may be connected to each of the indoor units 60 and 70, and fluid, such as water discharged from each of the indoor units 60 and 70 may be introduced into the second fluid passages 140b and 141b, and then the fluid passing through the second fluid passages 140b and 141b may be introduced into each of the indoor units 60 and 70.

The heat exchange device 100 may include a first branch tube 101 and a second branch tube 102, which may be branched from the first inner tube 11. However, the number of branch tubes branched from the first inner tube 11 is not limited.

A high-pressure refrigerant may, for example, flow through the first branch tube 101 and the second branch tube 102. Therefore, the first branch tube 101 and the second branch tube 102 may be referred to as "high-pressure tubes". The first branch tubes 101 and the second branch tubes 102 may be provided with first valves 103 and 104, respectively.

The heat exchange device 100 may include a third branch tube 105 and a fourth branch tube 106, which are branched from the second inner tube 15. However, the number of branch tubes branched from the second inner tube 15 is not limited. A low-pressure refrigerant may, for example, flow through the third branch tube 105 and the fourth branch tube 106. Therefore, the third branch tube 105 and the fourth branch tube 106 may be referred to as, for example, "low-pressure tubes". The third branch tube 105 and the fourth branch tube 106 may be provided with second valves 107 and 108, respectively.

The heat exchange apparatus 100 may include a first common gas tube 111 to which the first branch tube 101 and the third branch tube 105 may be connected and a second common gas tube 112 to which the second branch tube 102 and the fourth branch tube may be connected.

The first common gas tube 111 may be connected to one or a first end of the first fluid passage 140a of each of the heat exchangers 140 and 141. First and second tubes 121 and 122 may be connected to the other or a second end of the first fluid passage of each of the heat exchangers 140 and 141.

The first tube 121 may be connected to the first heat exchanger 140, and the second tube 122 may be connected to the second heat exchanger 141. A first expansion valve 123 may be provided in the first tube 121, and a second expansion valve 124 may be provided in the second tube 122. The first tube 121 and the second tube 122 may be connected to the third inner tube 17.

Each of the expansion valves 123 and 124 may include, for example, an electronic expansion valve (EEV). The EEV may adjust a degree of opening thereof to allow a pressure of the refrigerant passing through the expansion valve to decrease. For example, when the expansion valve is fully opened, the refrigerant may pass through the expansion valve without decreasing, and when the degree of opening of the expansion valve decreases, the refrigerant may be decompressed. A degree of decompression of the refrigerant may increase as the degree of opening decreases.

The indoor unit connection tubes 30 and 35 may include heat exchanger inlet tubes 31 and 36 and heat exchanger outlet tubes 32 and 37. Each of the heat exchanger inlet tubes 31 and 36 may be provided with pumps 151 and 152, respectively.

Each of the heat exchanger inlet tubes 31 and 36 and each of the heat exchanger outlet tubes 32 and 37 may be connected to the indoor heat exchangers 61 and 71, respectively. The heat exchanger inlet tubes 31 and 36 may serve as indoor unit inlet tubes with respect to the indoor heat exchangers 61 and 71, and the heat exchanger outlet tubes 32 and 37 may serve as the indoor heat exchangers 61 and 71 with respect to the indoor heat exchangers 61 and 71.

The heat exchange device 100 may further include a separate heat storage unit 150. The heat storage unit 150 may store heat when the air conditioning apparatus 1 performs the heating operation, or the plurality of indoor units perform the heating operation and then release the heat during an oil collection or defrosting operation. That is, during the defrosting operation or the oil collection operation, it is possible to block the inflow of a low-temperature refrigerant into the heat exchangers 140 and 141 of the heat exchange device 100.

For example, the heat storage unit 150 may include a tube through which the refrigerant passes and a heat storage medium that surrounds the tube. While a high-pressure refrigerant is introduced into the heat storage unit 150 to pass through the tube, the heat may be stored in the heat storage medium through heat exchange. For example, the heat storage medium may be a metal/carbon foam.

The heat exchange device 100 may further include a first heat storage branch tube 162 branched from the first inner tube 11. For example, the first heat storage branch tube 162 may allow the refrigerant in a high-pressure state to flow therethrough, and thus, may be referred to as a "high-pressure tube". A first heat storage valve 163 may be provided in the first heat storage branch tube 162.

The heat exchange device 100 may further include a second heat storage branch tube 164 branched from the second inner tube 15. For example, the second heat storage branch tube 164 may allow the refrigerant in a low-pressure state to flow therethrough, and thus, may be referred to as a "high-pressure tube". A second heat storage valve 165 may be provided in the second heat storage branch tube 164.

The heat exchange device 100 may include a heat storage common gas tube 161 to which the first heat storage branch tube 162 and the second heat storage branch tube 164 are connected.

The heat storage unit 150 may include a first fluid passage. The heat storage common gas tube 161 may be connected to one or a first end of the first fluid passage, and a heat storage tube 171 may be connected to the other or a second end of the second fluid passage.

A heat storage expansion valve 172 may be provided in the heat storage tube 171 and may be connected to the third inner tube 17. The heat storage expansion valve 172 may include, for example, an electronic expansion valve (EEV).

Figure 3:
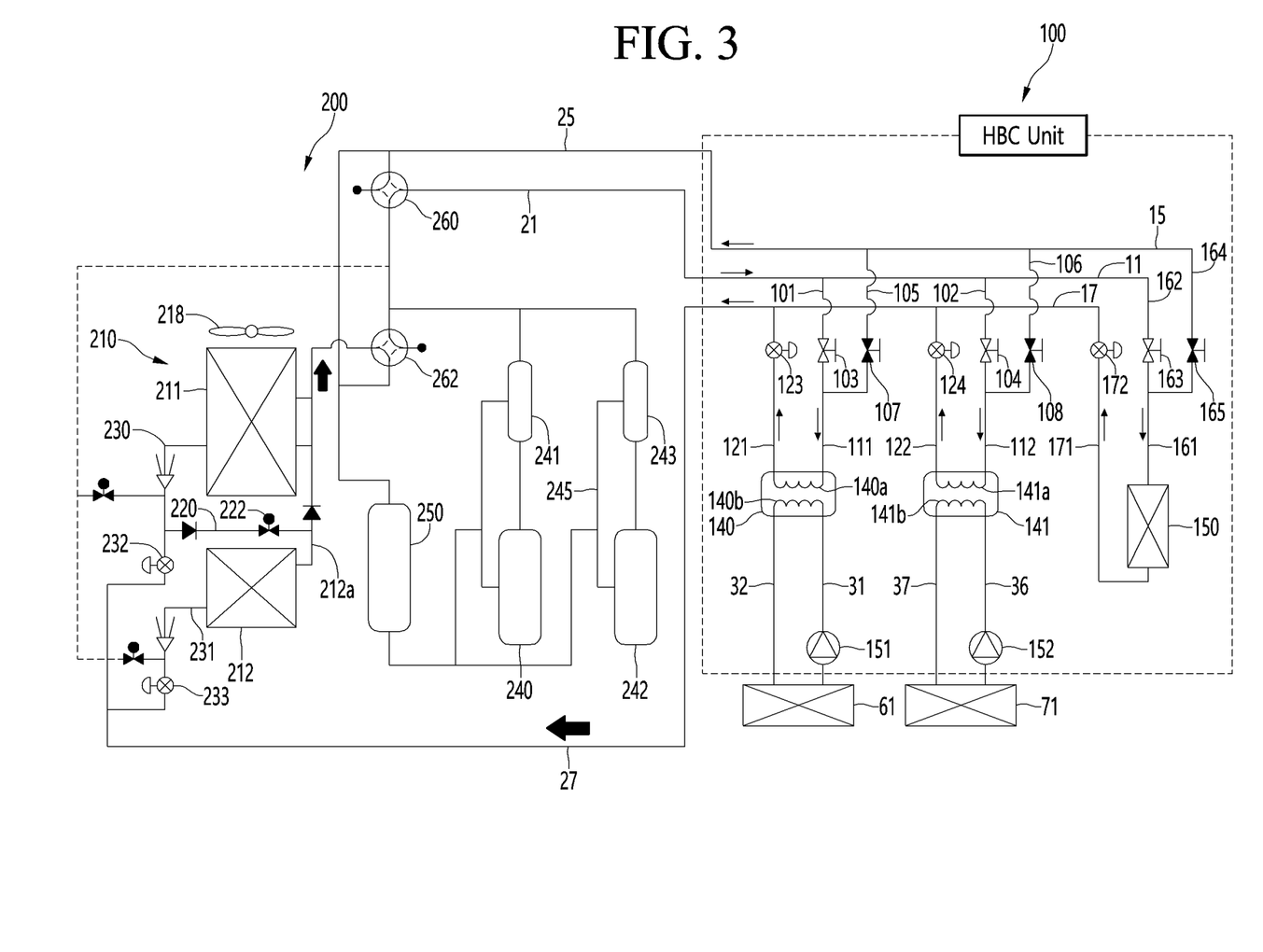
FIG. 3 is a cycle diagram illustrating flows of a first fluid, such as refrigerant and a second fluid, such as water in a heat exchange device during a heating operation of the air conditioning apparatus according to an embodiment.

FIG. 3 is a cycle diagram illustrating flows of a first fluid, such as refrigerant and a second fluid, such as water in a heat exchange device during a heating operation of the air conditioning apparatus according to an embodiment. Referring to FIG. 3, when the air conditioning apparatus 1 performs a heating operation, high-pressure gas refrigerant compressed by compressors 240 and 242 of outdoor unit 200 may flow to first outdoor unit connection tube 21 and first inner tube 11 and then be branched into first branch tube 101 and second branch tube 102.

When the air conditioning apparatus 1 performs the heating operation, the first valves 103 and 104 of first and second branch tubes 101 and 102 are opened, and second valves 107 and 108 of third and fourth branch tubes 105 and 106 are closed. The refrigerant branched into the first branch tube 101 flows along first common gas tube 111 and then flows into first fluid passage 140a of the first heat exchanger 140.

The refrigerant branched into the second branch tube 102 flows along second common gas tube 112 and then flows into first fluid passage 141a of second heat exchanger 141.

In this embodiment, when the air conditioning apparatus 1 performs the heating operation, each of the heat exchangers 140 and 141 may serve as a condenser. When the air conditioning apparatus 1 performs the heating operation, the first expansion valve 123 and the second expansion valve 124 are opened.

The refrigerant passing through the first fluid passages 140a and 141a of the heat exchangers 140 and 141 flows to third inner tube 17 after passing through each of expansion valves 123 and 124. The refrigerant discharged into the third inner tube 17 may be introduced into the outdoor unit 200 and then be introduced into the compressors 240 and 242. For example, the refrigerant passing through third outdoor unit connection tube 27 may flow to the outdoor heat exchange device 210.

The refrigerant passing through the outdoor heat exchange device 210 to perform heat exchange may pass through second flow switching portion 262 to flow into the plurality of compressors 240 and 242. The high-pressure refrigerant compressed by the plurality of compressor 240 and 242 flows again to heat exchange device 100 through the first outdoor unit connection tube 21.

The fluid, such as water flowing through the second fluid passage of each of the heat exchangers 140 and 141 may be heated by heat-exchange with the refrigerant, and the heated fluid may be supplied to each of the indoor heat exchangers 61 and 71 to perform heating.

While each of the heat exchangers 140 and 141 performs the heating operation, the second heat storage valve 165 is closed, and the first heat storage valve 163 is opened. That is, high-pressure gaseous refrigerant compressed by the compressor 11 of the outdoor unit 200 may also be branched to flow to the first heat storage branch tube 162 and then flow to heat storage unit 150 through heat storage common gas tube 161.

The heat storage unit 150 may receive the heat from the introduced high-pressure gaseous fluid to store the heat. Also, the heat storage expansion valve 172 may be opened to adjust a flow rate so as to maintain an appropriate degree of supercooling. That is, the refrigerant passing through the heat storage unit 150 may flow to the third inner tube 17 through heat storage tube 171.

Figure 4:
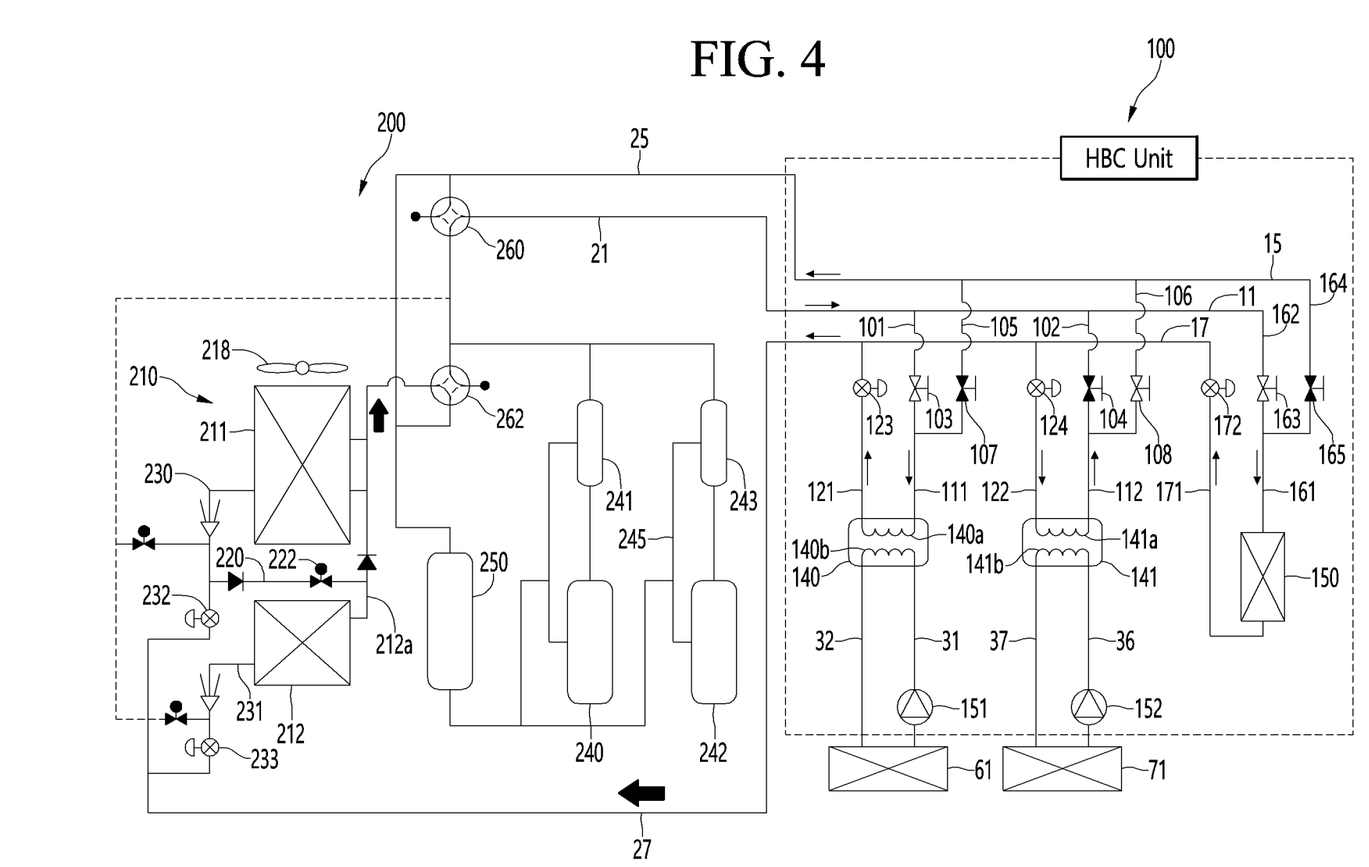
FIG. 4 is a cycle diagram illustrating flows of a first fluid, such as refrigerant and a second fluid, such as water in the heat exchange device during a heating-based simultaneous operation of the air conditioning apparatus according to an embodiment.

FIG. 4 is a cycle diagram illustrating flows of a first fluid, such as refrigerant and a second fluid, such as water in the heat exchange device during a heating-based simultaneous operation of the air conditioning apparatus according to an embodiment. The heating-based simultaneous operation of the air conditioning apparatus means a case in which the plurality of indoor units operate for heating. One of the heat exchangers 140 and 141 may perform heat exchange for heating, and the other may perform heat exchange for cooling.

For example, as described above, in the operation of the first heat exchanger 140, the first valve 103 of the first branch tube 101 is opened, the second valve of the third branch tube 105 is closed, and the first expansion valve 123 is opened so that the refrigerant flows as in the heating operation. However, the first valve 104 of the second branch tube 102 is closed, and the second valve 108 of the fourth branch tube 106 and the second expansion valve 124 are opened.

That is, the refrigerant branched from the third inner tube 17 and distributed to the second tube 122 may be reduced to low-pressure refrigerant while passing through the second expansion valve 124. The decompressed refrigerant is evaporated through heat exchange with the second fluid along the first fluid passage of the second heat exchanger 141 and then flows to the second tube 122. The refrigerant flowing to the second common gas tube 122 passes through the fourth branch tube 106 to flow into the second inner tube 15.

In this case, the refrigerant flowing to the heat storage unit 150 may operate as in the heating operation. That is, when the heating-based simultaneous operate is performed, the air conditioning apparatus 1 operates similar to the heating operation, and it is advantageous that the heat storage unit 150 performs an operation of storing heat. Also, the refrigerant flowing to the outdoor unit 200 may also flow in the same manner as when the air conditioning apparatus 1 performs the heating operation.

Figure 5:
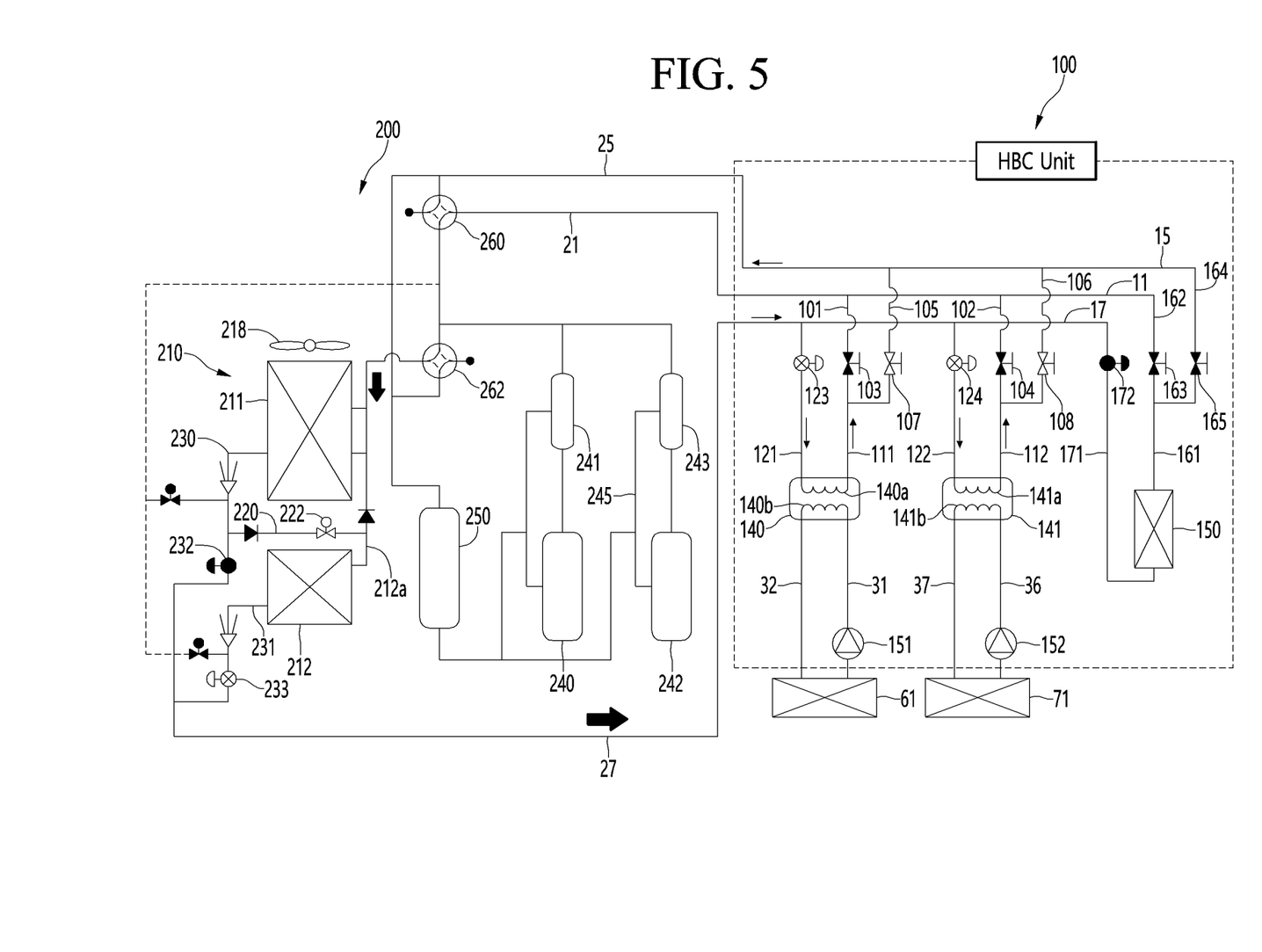
FIG. 5 is a cycle diagram illustrating flows of a first fluid, such as refrigerant and a second fluid, such as water in the heat exchange device during a cooling operation of the air conditioning apparatus according to an embodiment.
Figure 6:
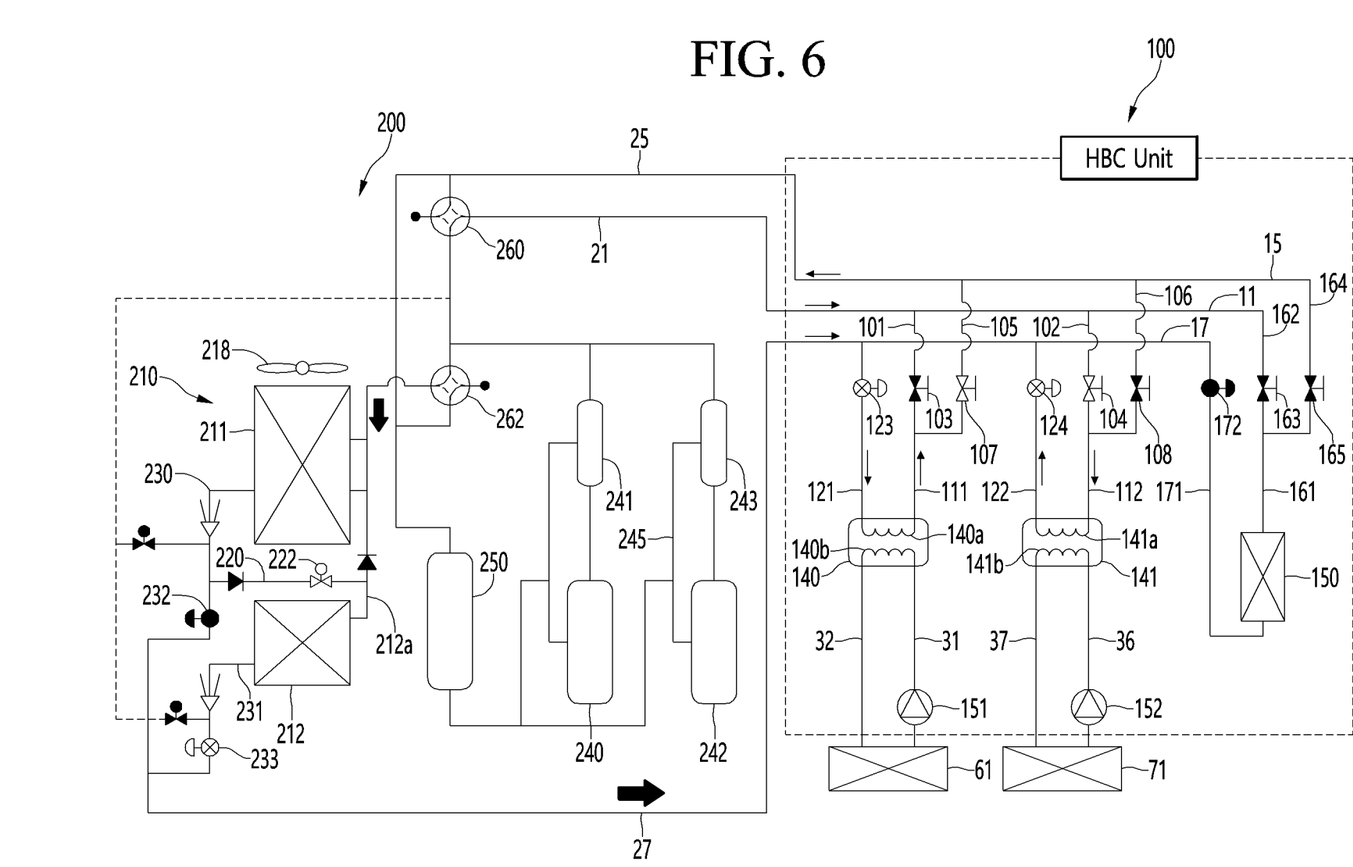
FIG. 6 is a cycle diagram illustrating flows of a first fluid, such as refrigerant and a second fluid, such as water in the heat exchange device during a cooling-based simultaneous operation of the air conditioning apparatus according to an embodiment.

FIG. 5 is a cycle diagram illustrating flows of a first fluid, such as refrigerant and a second fluid, such as water in the heat exchange device during a cooling operation of the air conditioning apparatus according to an embodiment. FIG. 6 is a cycle diagram illustrating flows of a first fluid, such as refrigerant and a second fluid, such as water in the heat exchange device during a cooling-based simultaneous operation of the air conditioning apparatus according to an embodiment.

Referring to FIG. 5, when the air conditioning apparatus 1 performs the cooling operation, the high-pressure liquid refrigerant condensed in the outdoor heat exchanger 210 of the outdoor unit 200 may flow through the third outdoor unit connection tube 27 and the third inner tube 17 and then be distributed into the first tube 121 and the second tube 122. As the expansion valves 123 and 124 provided in the first and second tubes 121 and 122 are opened to a predetermined degree, the refrigerant may be decompressed into the low-pressure refrigerant while passing through the expansion valves 123 and 124.

The decompressed refrigerant may be heat-exchanged with the first fluid, and thus, be evaporated while flowing along the refrigerant passages 140a and 141a of the heat exchangers 140 and 141. That is, when the air conditioning apparatus 1 performs the cooling operation, each of the heat exchangers 140 and 141 may serve as an evaporator.

While the air conditioning apparatus 1 performs the cooling operation, the first valves 103 and 104 of the first and second branch tubes 101 and 102 are closed, and the second valves 107 and 108 of the third and fourth branch tubes 105 and 106 are opened. Therefore, the refrigerant passing through the refrigerant passages 140a and 141a of the heat exchangers 140 and 141 flows to each of the common gas tubes 111 and 112. The refrigerant flowing to each of the common gas tubes 111 and 112 flows into the second inner tube 15 after flowing through the third and fourth branch tubes 105 and 106.

The refrigerant discharged into the second inner tube 15 may be introduced into the outdoor unit 200 and be suctioned into the compressors 240 and 242. The high-pressure refrigerant compressed by the compressors 240 and 242 may be condensed in the outdoor heat exchanger 210, and the condensed liquid refrigerant may again flow along the third outdoor unit connection tube 27.

All of the valves provided in the tube connected to the heat storage unit 150 may be in a closed state. That is, all the first heat storage valve 163, the second heat storage valve 165, and the heat storage expansion valve 172 may be closed so that the refrigerant does not flow to the heat storage unit 150.

During the cooling operation, because the refrigerant may flow through the second inner tube 15 through the low-pressure gas refrigerant flows and the third inner tube 17 through which the high-pressure liquid refrigerant flows to operate, the heat storage unit 150 cannot perform a function for storing heat. Thus, during the cooling operation of the air conditioning apparatus 1 or the cooling-based simultaneous operation, the refrigerant does not flow to the heat storage unit 150.

Since the flow of the second fluid is the same as that described in FIG. 3, detailed description thereof has been omitted.

FIG. 6 illustrates a flow of a first fluid, such as refrigerant and a second fluid, such as water when the air conditioning apparatus 1 performs the cooling-based simultaneous operation, that is, when the plurality of indoor units performs the cooling operation. That is, one of the heat exchangers 140 and 141 may perform heat exchange for heating, and the other may perform heat exchange for cooling. The outdoor unit 200 may be the same as that of the cooling operation as described in FIG. 5.

Figure 7:
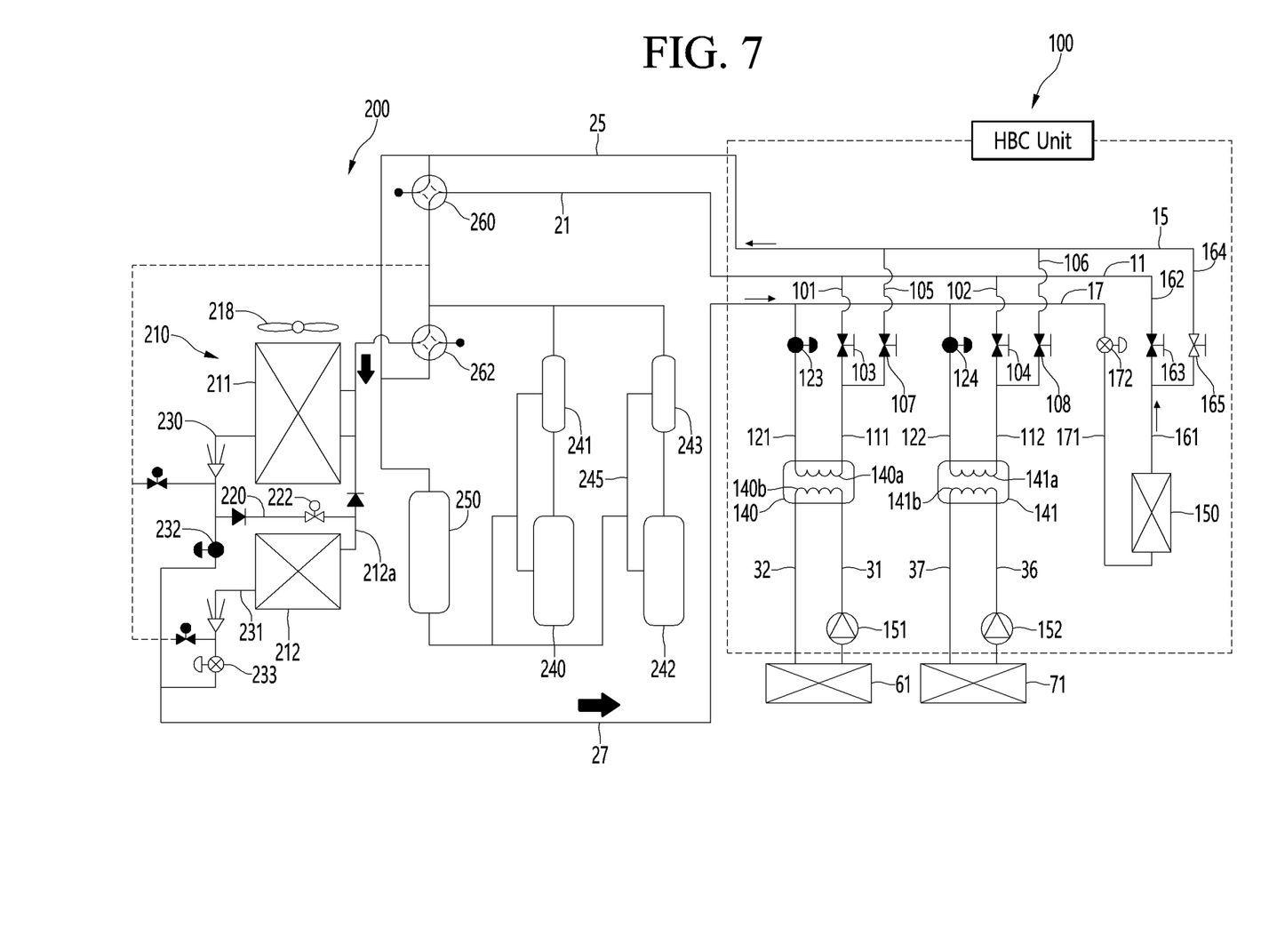
FIG. 7 is a cycle diagram illustrating flows of a first fluid, such as refrigerant and a second fluid, such as water in the heat exchange device during an oil collection or defrosting operation of the air conditioning apparatus according to an embodiment.
Figure 8:
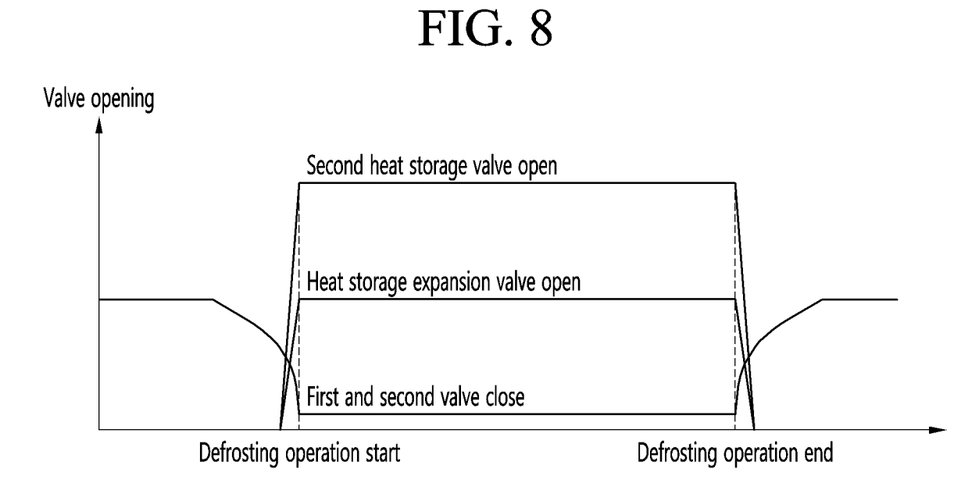
FIG. 8 is a schematic view illustrating an opening degree of a valve during the defrosting operation of the air conditioning apparatus according to an embodiment.

FIG. 7 is a cycle diagram illustrating flows of a first fluid, such as refrigerant and a second fluid, such as water in the heat exchange device during the oil collection or defrosting operation of the air conditioning apparatus according to an embodiment. FIG. 8 is a schematic view illustrating an opening degree of the valve during the defrosting operation of the air conditioning apparatus according to an embodiment.

The air conditioning apparatus 1 may perform an operation for collecting refrigerant or oil accumulated in the tube or the heat exchanger under certain conditions, that is, the oil collection operation. Also, the air conditioning apparatus 1 may perform a separate defrosting operation to prevent the outdoor unit affected by an external temperature from being frozen.

The air conditioning apparatus 1 may obtain heat from circulating fluid, such as water to perform the defrosting or oil collection operation, the refrigerant having a sub-zero temperature flows to the heat exchangers 140 and 141. In some cases, the heat exchangers 140 and 141 are damaged due to freezing of fluid, such as water after being heat-exchanged with fluid, such as refrigerant. Thus, during the oil collection or defrost operation, the introduction of the refrigerant to the heat exchangers 140 and 141 may be blocked, and the oil collection or defrost operation may be performed through heat stored in the heat storage unit 150.

More particularly, all the first valves 103 and 104 of the first and second branch tubes 101 and 102, the second valves 107 and 108 of the third and fourth branch tubes 105 and 106, and the expansion valves 123 and 124 of the first and second tubes 121 and 122 may be closed to block the refrigerant introduced into the heat exchangers 140 and 141. Also, the first heat storage valve 163 may be closed, and the second heat storage valve 165 and the heat storage expansion valve 172 may be opened.

That is, the liquid refrigerant distributed from the third inner tube 17 to the heat storage tube 171 may be reduced to a low-pressure refrigerant while passing through the heat storage expansion valve 172. Also, the heat storage expansion valve 172 may adjust an opening degree of the heat storage expansion valve 172 to adjust a flow rate of the refrigerant so that appropriate superheating is maintained.

The refrigerant introduced into the heat storage unit 150 through the heat storage tube 171 may receive heat stored in the heat storage unit 150 to flow to the heat storage common gas tube 161.

The refrigerant passing through the heat storage common gas tube 161 may flow to the second heat storage branch tube 164 to flow to the second inner tube 15. The refrigerant discharged through the second inner tube 15 may be introduced into the outdoor unit 200 through the second outdoor unit connecting tube 25 and then be suctioned into the compressors 240 and 242.

Referring to FIG. 8, defrosting may start in a state in which the first and second expansion valves 123 and 124 are completely closed, and the second heat storage valve 165 and the heat storage expansion valve 172 are completely opened. The defrosting operation may be terminated at a time point at which the second heat storage valve 165 and the heat storage expansion valve 172 start to be closed. Also, during the defrosting operation, the opening degree of the second heat storage valve 165 may be less than of the heat storage expansion valve 172.

According to the embodiment, as the separate heat storage unit is interlocked with the plurality of heat exchangers, the heat may be stored in the heat storage unit during the heating operation, and the heat stored in the heat storage unit may be used during the oil collection operation or the defrosting operation to prevent the water from being frozen in the water passage of the heat exchanger. In addition, the heat used during the defrosting operation or the oil collection operation may be secured to secure performance of the defrosting or coil collection operation under the low-temperature condition.

Embodiments disclosed herein provide an air conditioning apparatus in which a fluid, such as water is frozen in a water passage of a heat exchanger during an oil collection/defrosting operation. Embodiments disclosed herein also provide an air conditioning apparatus, which includes a separate heat storage unit to receive heat from a heat storage unit, thereby performing an oil collection operation or defrosting operation.

In an air conditioning apparatus according to embodiments disclosed herein, a refrigerant having a sub-zero temperature may flow to a heat exchange device to prevent the heat exchange device from being damaged by the freezing of fluid, such as water, and when a heating operation is performed, heat may be stored through a heat storage unit to release the heat during a defrosting operation or an oil collection operation.

According to an embodiment, an air conditioning apparatus may include an outdoor unit through which a refrigerant circulates; an indoor unit through which fluid, such as water circulates; and a heat exchange device which is configured to connect the outdoor unit to the indoor unit and in which the refrigerant and the fluid are heat-exchanged with each other. The heat exchange device may include first to third inner tubes connected to the outdoor unit connection tube provided in the outdoor unit, and a heat storage unit connected to the first to third inner tubes to store heat transferred through the first inner tube, thereby dissipating the heat through the second inner tube.

The air conditioning apparatus may further include a first heat storage branch tube branched from the first inner tube; a first heat storage valve provided in the first heat storage branch tube; a second heat storage branch tube branched from the second inner tube; and a second heat storage valve provided in the second heat storage branch tube. When a heating operation is performed, the first heat storage valve may be opened and the second heat storage valve may be closed. When a defrosting operation is performed, the second heat storage valve may be opened and the first heat storage valve may be closed. When an oil collection operation is performed, the second heat storage valve may be opened and the first heat storage valve may be closed. When a heating-based simultaneous operation is performed, the first heat storage valve may be opened and the second heat storage valve may be closed.

The air conditioning apparatus may further include a heat storage tube branched from the third inner tube, and a heat storage expansion valve provided in the heat storage tube. When a cooling operation is performed, the heat storage expansion valve and the first and second heat storage valves may be closed.

The heat exchange device may further include a heat storage common gas tube to which the first heat storage branch tube and the second heat storage branch tube may be connected. The heat storage unit may include a tube configured to define a refrigerant passage and a heat storage medium configured to surround the tube.

The heat exchange device may include a first heat exchanger and a second heat exchanger; a first branch tube and a second branch tube, which are branched from the first inner tube; a first valve provided in each of the first branch tube and the second branch tube; a third branch tube and a fourth branch tube, which are branched from the second inner tube; and a second valve provided in each of the third branch tube and the fourth branch tube. The air conditioning apparatus may further include a first tube and a second tube, which are branched from the third inner tube; a first expansion valve provided in the first tube; and a second expansion valve provided in the second tube.

When a defrosting operation is performed, the first valve, the second valve, the first expansion valve, and the second expansion valve may be closed. When oil collection operation is performed, the first valve, the second valve, the first expansion valve, and the second expansion valve may be closed.

Each of the heat exchangers may include a first fluid passage through which the refrigerant flows, and a second fluid passage through which fluid, such as water to be heat-exchanged with the refrigerant within the first fluid passage flows. The fluid flowing through the second fluid passage may flow to the indoor unit.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioning apparatus, comprising:
   an outdoor unit through which a refrigerant circulates;
   an indoor unit through which a fluid circulates; and
   a heat exchange device which is configured to connect the outdoor unit to the indoor unit and in which the refrigerant and the fluid are heat-exchanged with each other, wherein the heat exchange device comprises:
      first to third inner tubes connected to an outdoor unit connection tube provided in the outdoor unit, and a heat storage unit connected to the first to third inner tubes to store heat transferred through the first inner tube, thereby dissipating the heat through the second inner tube.

2. The air conditioning apparatus according to claim 1, further comprising:
   a first heat storage branch tube branched from the first inner tube;
   a first heat storage valve provided in the first heat storage branch tube;
   a second heat storage branch tube branched from the second inner tube; and
   a second heat storage valve provided in the second heat storage branch tube.

3. The air conditioning apparatus according to claim 2, wherein when a heating operation is performed, the first heat storage valve is opened and the second heat storage valve is closed.

4. The air conditioning apparatus according to claim 2, wherein when a defrosting operation is performed, the second heat storage valve is opened and the first heat storage valve is closed.

5. The air conditioning apparatus according to claim 2, wherein when an oil collection operation is performed, the second heat storage valve is opened and the first heat storage valve is closed.

6. The air conditioning apparatus according to claim 2, further comprising:
   a heat storage tube branched from the third inner tube; and
   a heat storage expansion valve provided in the heat storage tube.

7. The air conditioning apparatus according to claim 6, wherein when a heating-based simultaneous operation is performed, the heat storage expansion valve and the first heat storage valve are opened, and the second heat storage valve is closed.

8. The air conditioning apparatus according to claim 7, wherein when a cooling operation is performed, the heat storage expansion valve and the first and second heat storage valves are closed.

9. The air conditioning apparatus according to claim 2, further comprising a heat storage common gas tube to which the first heat storage branch tube and the second heat storage branch tube are connected.

10. The air conditioning apparatus according to claim 1, wherein the heat storage unit further comprises a tube configured to define a refrigerant passage and a heat storage medium configured to surround the tube.

11. The air conditioning apparatus according to claim 1, wherein the heat exchange device further comprises:
   a first heat exchanger and a second heat exchanger;
   a first branch tube and a second branch tube, which are branched from the first inner tube;
   a first valve provided in each of the first branch tube and the second branch tube;
   a third branch tube and a fourth branch tube, which are branched from the second inner tube; and
   a second valve provided in each of the third branch tube and the fourth branch tube.

12. The air conditioning apparatus according to claim 11, further comprising:
   a first tube and a second tube, which are branched from the third inner tube;
   a first expansion valve provided in the first tube; and
   a second expansion valve provided in the second tube.

13. The air conditioning apparatus according to claim 12, wherein when a defrosting operation is performed, the first valve, the second valve, the first expansion valve, and the second expansion valve are closed.

14. The air conditioning apparatus according to claim 12, wherein when an oil collection operation is performed, the first valve, the second valve, the first expansion valve, and the second expansion valve are closed.

15. The air conditioning apparatus according to claim 11, wherein each of the heat exchangers comprises:
- a first fluid passage through which the refrigerant flows; and
- a second fluid passage through which the fluid to be heat-exchanged with the refrigerant within the first fluid passage flows, wherein the fluid flowing through the second fluid passage flows to the indoor unit.

16. An air conditioning apparatus, comprising:
an outdoor unit through which a first fluid circulates;
an indoor unit through which a second fluid circulates; and
a heat exchange device which is configured to connect the outdoor unit to the indoor unit and in which the first fluid and the second fluid are heat-exchanged with each other, wherein the heat exchange device comprises:
- a plurality of inner tubes connected to the outdoor unit, and a heat storage unit connected to the plurality of inner tubes to store heat transferred through a first inner tube of the plurality of inner tubes, thereby dissipating the heat through a second inner tube of the plurality of inner tubes;
- a first heat storage branch tube branched from the first inner tube;
- a first heat storage valve provided in the first heat storage branch tube;
- a second heat storage branch tube branched from the second inner tube; and
- a second heat storage valve provided in the second heat storage branch tube, wherein when a heating operation is performed, the first heat storage valve is opened and the second heat storage valve is closed; wherein when a defrosting operation is performed, the second heat storage valve is opened and the first heat storage valve is closed; and wherein when an oil collection operation is performed, the second heat storage valve is opened and the first heat storage valve is closed.

17. The air conditioning apparatus according to claim 16, wherein the heat exchange device further comprises:
- a first heat exchanger and a second heat exchanger;
- a first branch tube and a second branch tube, which are branched from the first inner tube;
- a first valve provided in each of the first branch tube and the second branch tube;
- a third branch tube and a fourth branch tube, which are branched from the second inner tube; and
- a second valve provided in each of the third branch tube and the fourth branch tube.

18. An air conditioning apparatus, comprising:
an outdoor unit through which a first fluid circulates;
an indoor unit through which a second fluid circulates; and
a heat exchange device which is configured to connect the outdoor unit to the indoor unit and in which the first fluid and the second fluid are heat-exchanged with each other, wherein the heat exchange device comprises:
- a plurality of inner tubes connected to the outdoor unit, and a heat storage unit connected to the plurality of inner tubes to store heat transferred through a first inner tube of the plurality of inner tubes, thereby dissipating the heat through a second inner tube of the plurality of inner tubes;
- a heat storage tube branched from a third inner tube of the plurality of inner tubes; and
- a heat storage expansion valve provided on the heat storage tube.

19. The air conditioning apparatus according to claim 17, wherein when a heating-based simultaneous operation is performed, the heat storage expansion valve and the first heat storage valve are opened, and the second heat storage valve is closed.

20. The air conditioning apparatus according to claim 18, wherein when a cooling operation is performed, the heat storage expansion valve and the first and second heat storage valves are closed.

* * * * *